US006928260B2

(12) United States Patent
Betz et al.

(10) Patent No.: US 6,928,260 B2
(45) Date of Patent: Aug. 9, 2005

(54) ONLINE EDUCATION SYSTEM AND METHOD

(75) Inventors: Michael J. Betz, Lilburn, GA (US); William Ganza, Athens, GA (US); Christopher Nalesnik, Roswell, GA (US)

(73) Assignee: ChildCare Education Institute, LLC, Duluth, GA (US)

( * ) Notice: Subject to any disclaimer, the term of this patent is extended or adjusted under 35 U.S.C. 154(b) by 54 days.

(21) Appl. No.: 09/829,830

(22) Filed: Apr. 10, 2001

(65) Prior Publication Data

US 2002/0146674 A1 Oct. 10, 2002

(51) Int. Cl.[7] ............................................. G09B 7/00
(52) U.S. Cl. ................... 434/350; 434/362; 434/307 R
(58) Field of Search ................................ 434/350, 362, 434/322, 323, 118, 307 R

(56) References Cited

U.S. PATENT DOCUMENTS

| | | | | |
|---|---|---|---|---|
| 3,654,708 A | * | 4/1972 | Brudner | ................... 434/307 R |
| 3,829,987 A | * | 8/1974 | Matysek | ................. 434/315 X |
| 4,586,905 A | * | 5/1986 | Groff | ....................... 434/307 R |
| 4,682,957 A | | 7/1987 | Young | |
| 4,785,472 A | | 11/1988 | Shapiro | |
| 4,798,543 A | * | 1/1989 | Spiece | ......................... 434/323 |
| 5,002,491 A | | 3/1991 | Abrahamson et al. | |
| 5,195,033 A | * | 3/1993 | Samph et al. | ........... 434/323 X |
| 5,295,836 A | | 3/1994 | Ryu et al. | |
| 5,303,042 A | | 4/1994 | Lewis et al. | |
| 5,344,326 A | * | 9/1994 | Ferris | .......................... 434/336 |
| 5,441,415 A | * | 8/1995 | Lee et al. | ............... 434/350 X |
| 5,597,312 A | | 1/1997 | Bloom et al. | |
| 5,700,149 A | * | 12/1997 | Johnson, III et al. | ... 434/322 X |
| 5,797,754 A | | 8/1998 | Griswold et al. | |
| 5,823,788 A | | 10/1998 | Lemelson et al. | |

(Continued)

OTHER PUBLICATIONS

Information from The Indianapolis Star, "Panel Urges Expansion of Online Education—Study recommends more funds and rule changes to encourage learning via the web." Printed Dec. 20, 2000.

*Primary Examiner*—Chanda L. Harris
(74) *Attorney, Agent, or Firm*—Ice Miller; Doreen J. Gridley; Alexander D. Forman

(57) ABSTRACT

A method and system for online education that includes an educator provider system and at least one student system connected via a network means so that at least one lesson can be transmitted from the provider system to the student system. One embodiment of the present invention uses an interactive lesson with at least one audio file that controls the pace of the presentation of the lesson. The present invention can further comprise a mechanism for generating a lesson completion record after a student has completed the lesson. The lesson completion record is immediately transmitted upon completion of the lesson to a student and/or an education authority in order to certify that the student has completed the lesson and has spent the requisite minimum time period on that lesson.

33 Claims, 23 Drawing Sheets

U.S. PATENT DOCUMENTS

| | | | | |
|---|---|---|---|---|
| 5,907,831 A | * | 5/1999 | Lotvin et al. | 705/14 |
| 6,029,043 A | | 2/2000 | Ho et al. | |
| 6,077,085 A | | 6/2000 | Parry et al. | |
| 6,099,320 A | * | 8/2000 | Papadopoulos | 434/322 X |
| 6,112,049 A | * | 8/2000 | Sonnenfeld | 434/350 X |
| 6,120,300 A | | 9/2000 | Ho et al. | |
| 6,125,358 A | | 9/2000 | Hubbell et al. | |
| 6,139,330 A | | 10/2000 | Ho et al. | |
| 6,146,148 A | | 11/2000 | Stuppy | |
| 6,154,631 A | * | 11/2000 | Remschel | 434/350 |
| 6,155,839 A | | 12/2000 | Clark et al. | |
| 6,155,840 A | * | 12/2000 | Sallette | 434/323 X |
| 6,162,060 A | * | 12/2000 | Richard et al. | 434/118 X |
| 6,282,404 B1 | * | 8/2001 | Linton | 434/350 X |
| 6,296,489 B1 | * | 10/2001 | Blass et al. | 434/185 X |
| 6,301,462 B1 | * | 10/2001 | Freeman et al. | 434/350 X |
| 6,341,212 B1 | * | 1/2002 | Shende et al. | 434/350 X |
| 6,347,333 B2 | * | 2/2002 | Eisendrath et al. | 709/217 |
| 6,381,444 B1 | * | 4/2002 | Aggarwal et al. | 434/350 X |
| 6,386,882 B1 | * | 5/2002 | Linberg | 434/262 X |
| 6,397,036 B1 | * | 5/2002 | Thean et al. | 434/350 X |
| 6,398,556 B1 | * | 6/2002 | Ho et al. | 434/219 X |
| 6,678,824 B1 | * | 1/2004 | Cannon et al. | 713/200 |
| 2001/0039003 A1 | * | 11/2001 | Huang | 434/350 |
| 2001/0053513 A1 | * | 12/2001 | Corn et al. | 434/350 |
| 2002/0034721 A1 | * | 3/2002 | McManus et al. | 434/350 |
| 2002/0051962 A1 | * | 5/2002 | Alling | 434/350 |

* cited by examiner

Professional Training & Consulting
Early Childhood Online Training

You must sign up for courses before you can log in. If you have signed up, please enter your user ID and password.

User ID: ▭ 45

Password: ▭ 47

Forgot your password? 49

| Log In | Clear |
|--------|-------|
| 48 | 46 |

Fig. 2

Professional Training & Consulting

Early Childhood Online Training
Your Current Courses

Doreen Gridley, welcome to PTC Online Training.

| Course ID | Course Title | Sign-Up Date | Status | Action? |
|---|---|---|---|---|
| EPTC440 | Sensational Science | 12-21-00 | CURRENT | Take Course |

Professional Training & Consulting
Early Childhood Online Training
System Requirements Use PTC's Browser Test to make sure that your computer is set up for Online Learning.

Our user-friendly browser check will lead you through a series of tests to make sure that your system is correctly configured for taking our online classes. If your computer doesn't meet our minimum requirements, the test will help you to get any needed components.

 Check Your Browser

**\*\*IMPORTANT INSTRUCTIONS FOR AOL USERS\*\***

PTC recommends the following minimum system requirements for taking our online learning courses:

| Component | Minimum specifications |
|---|---|
| Processor | Intel Pentium or compatible, 133 MHz or higher |
| Operating System | Windows 95, Windows 98, Windows NT, Mac OS 8 |
| Monitor/Video Display | 640x480 resolution, 256-color or higher |
| Modem Speed | Minimum 28.8 Kbps/56.6 Kbps recommended |
| Additional Hardware | sound card, speakers, keyboard, mouse |
| Supported Internet Browsers | Internet Explorer version 4.0 and higher, Netscape version 4.0 and higher, or other browser with Shockwave 8 and JavaScript enabled. |
| Browser Plug-in | Macromedia Shockwave 8 |

Fig. 4A

If you have specific questions about these requirements, please e-mail tech@pictraining.com or call PTC tech support at 1-800-499-9907.

Copyright ©1990-2000 Professional Training & Consulting

Installing Macromedia's Shockwave 8 plug-in: Netscape Navigator

Because of the way Netscape Navigator handles plug-ins, you will have to quit your browser during the Shockwave installation process, PTC recommends that you bookmark our site to ensure an easy, quick return. If you need help with bookmarking a site, go here for detailed instructions. Additionally, you should print or save these instructions for easy reference.

1. Click on the graphic to the left (Get Macromedia Shockwave Player) to go to the Macromedia Download Center.

2. Once there, Click "Download Now." Choose the directory where you want to save the Macromedia Shockwave Player installer and click Save. Write down the name of the file you are downloading as it appears in the "Save As..." dialog box, or use the "Find..." command to locate the file for step 2.

3. Quit your browser and double-click the Macromedia Shockwave Player Installer icon. Choose the Macromedia Shockwave Player-compatible browser you want to install Shockwave into and click Continue. the installer relaunches your browser and opens to the Macromedia Download Center to

Fig. 5A complete the installation.

4. Click through the dialog boxes that appear. When both the Macromedia Shockwave 8 Player and Macromedia Flash Player 5 movies begin playing on the Web page, your Macromedia Shockwave Player Installation is successful.

5. Return to PTC Online Learning to completed the System Requirements test via a bookmark or by entering this URL into the Location box:
http://www.ptctraining.com/online/sysreqs/system_requirements.htm

[Print Instructions]

Fig. 5B

Professional Training and Consulting, Inc.

certifies that

*Doreen J. Gridley* completed the course
Rainbows and Rembrandts: Including Fine Art in Young Children's Programs( EPTC76)
*Monday November 13th 2000 08:30 A.M.*

Authorized Signature

User ID: DGRIDL1
Certificate ID Number: 9C5C23
Approved for 1 clock hour/.1 CEU

Classes are CEU approved through Clayton College and State University and provide clock hour credit for required training training for child care professionls.

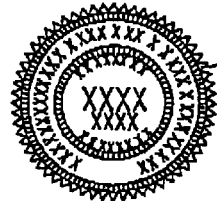

— 150
— 152
154 —

| Print Certificate | — 156

Fig. 12

ONLINE EDUCATION SYSTEM AND METHOD

FIELD OF THE INVENTION

This invention relates to a system and method for education, and, in particular to an online education system and method for use over a network.

BACKGROUND OF THE INVENTION

Computerized learning technologies have been evolving and gaining popularity over the last several decades, generally computer learning devices and techniques developed in step with the development of computer and related technology. Consider, for example, the system of U.S. Pat. No. 4,798,453, Spiece. This system is a stand-alone computer that presents prerecorded lessons to the student, and allows the student to take tests using the computer. The application for the Spiece patent was filed in 1983, a time in which personal computers were relatively new to the world, and in which video discs were used to present movies and the like. Hence, Spiece uses video discs and a personal computer in its education system.

As telecommunications technology developed, more interactive learning systems began to develop to permit lecturers to present lessons and/or materials to students located in remote locations. U.S. Pat. No. 4,682,957, Young, for example, allows a presenter at one location to control the presentation to students at remote locations. The control is achieved by the use of control signals sent over communications lines. Other "live" interactive education systems include those of U.S. Pat. No. 4,785,472, Shapiro; U.S. Pat. No. 5,295,836, Ryu et al.; U.S. Pat. No. 5,303,042, Lewis et al.; and U.S. Pat. No. 5,823,788, Lemelson et al.

With the availability of the Internet, many "distance learning" systems have been put into place, and distance learning may, in fact, be one of the fastest growing applications of communications technology. Many educational institutions, including but not limited to colleges and universities, are instituting learning programs over the Internet. Internet training can be made available to students at any time in any location. Students no longer need to travel to specific classroom sites. Thus, the cost of delivery of such online education systems is significantly less than the cost of traditional classroom education. A teaching institution no longer needs a building to house the classroom. If teachers are required, they need only make their lecture once, and that lecture can be recorded, stored, and used over and over again, if appropriate. Materials can be developed for use with a course that are used over and over again. In fact, it may be easier to continue to improve the "class" in an online application due to the fact that the class can be reviewed by appropriate authorities, measurements can be put into place to test the effectiveness of the class, and consistency is easier to achieve due to the use of electronic means.

Various governments have recognized the importance of distance learning in continuing to educate their citizens. The Congress of the United States, for example, formed a Web-based Education Commission to evaluate and make recommendations about education over the Internet. The Commission stated, "The question is no longer if the Internet can be used to transform learning in new and powerful ways. The Commission has found that it can . . . Nor is the question, 'Should we invest the time, the energy and the money defining and shaping new learning opportunity?' The commission believes we should." Panel urges expansion of online education, "The Indianapolis Star", Dec. 20, 2000, page A7. The Commission asked for increased federal research in online education to determine the best use of computers in learning, and asked that there be "changes in federal regulations that limit financial aid for students who take college courses over the Web. A growing number of students, particularly older, nontraditional ones, are taking courses online." Id.

One of the challenges in delivery of training via the Internet is to insure delivery of the content in the context of a certain time frame. In other words, how does the educator insure that the student has proceeded through the course without skipping or skimming the content presented? How does the educator ensure that the student attended the course for the requisite time? Formal education and many industries require that students log a certain number of hours of training to be considered to have completed the course, or to be certified or licensed to practice. In a traditional classroom setting, for example, the student must attend a specified number of class hours. If the student misses too many hours of class, they may have to withdraw from the course or receive an "incomplete grade", for example.

One of the growing areas of education relates to continuing professional education. Forty-six states have requirements for continuing education of their teachers. Id. States have requirements that lawyers, accountants, and other professionals continue to take courses to continue to be admitted to practice his/her profession in that state. Many states require certified child care providers to have a certain number of qualified personnel on their staff, with the qualification for such personnel including a specified number of hours of initial and/or continuing education, also referred to as pre-service and/or in-service training, respectively. While the requirements regarding type of education, the type of courses, the number of hours of training, and the base time for completing the specified number of hours may vary across states and for different professions or occupations, key to most continuing education requirements is the need to "attend" classes, often for a specified number of hours.

Because it is difficult to ensure that a student has "attended" remote education class, many states or regulatory authorities have not permitted training by remote sources to qualify for satisfaction of the requirements for initial and/or continuing education classes. Instead, students are often only permitted to audit a course provided online without the grant of credit for the course. The reason for this course credit limitation is because there generally is no mechanism for making certain that the student did not skip or skim through the lesson, or did not simply start the lesson and walk away. Consider, for example, the child care education sites of Learning Options and ECE Training, or the technical training sites of Element K, LLC and Click2Learn, Inc. These systems present textual and/or graphic slides through which the student can advance at their own pace. The educator does not control the pace at which the student takes the course, and, therefore, the educator cannot be assured that the student attends the course for a requisite minimum time frame. While the prior art systems may test the student based on material presented, a student could, conceivably, just guess at the answers and be deemed to have successfully completed the course. An educator may want to make certain that a student earns his/her grades by completing a required minimum time attendance (minimum number of hours). Thus, it is desired to provide an online education system and method which ensures that the student "attended" the class for a desired time. Such a system and method would result in more accurate teaching of student outcomes for the course, greater confidence in the integrity of the course, and the educator being willing to accept a certificate of completion or the course meeting requirements, and subsequently granting course credit.

The immediacy of the Internet gives rise to another issue. It is not uncommon for a student to procrastinate in completing a course. Thus, if a student is required to take continuing professional education courses during a certain base time period, the student may wait to the last possible moment within that base time period to take the course. For example, if child care providers are required to complete a certain number of continuing education credits before the end of the calendar year, it is not uncommon for a student to wait until late December to fulfill those obligations. Because the credits are often necessary for certification, continued employment, and continued operation of the child care center, it is important that the completion of the course(s) by the student, even if at the last possible moment, be acknowledged. Therefore, it is desired to provide an online system and method for immediate acknowledgement of completion of the course, particularly, if a regulating body may require proof of such completion.

SUMMARY OF THE INVENTION

The present invention is a system and method for online education. In one embodiment, the online education system includes an educator provider system, at least one student system, and a network connected to the educator provider system and the at least one student system for bidirectional communication therebetweeen. The educator provider system is likely to be operated by an educational institution which offers lessons (also referred to herein as courses), or by a third party who makes such lessons available over the network for the benefit of one or more educational institutions. Each lesson transmitted by the educator provider system to the at least one student system is interactive, and includes at least one audio file. The pace of the presentation of the lesson to a student at the at least one student system is controlled by an audio controlling mechanism based on the received audio file. The audio file maybe instructional in addition to being used to control the pace of the lesson and insure attendance of the course for a minimum time period.

In one embodiment, the network comprises the Internet, and each student system comprises a computing unit having a browser operable thereon. Working in conjunction with the browser is a browser compatible plug-in for audio streaming. In another embodiment, the audio streaming capability is included in the browser. The student is not permitted to advance during the time that the audio file is "played" by the plug-in and/or browser. In this manner, the rate of advancement of the educational material presented to the student is controlled by the system.

In one embodiment, each lesson comprises a plurality of presentations. Each presentation has associated therewith at least one audio file. The student is prohibited from advancing forward from one presentation to the next by the audio controlling means. Specifically, the audio file(s) associated with the presentation must be completely played at the student system before the student can advance to the next presentation. In this manner, the pace of the presentation of the lesson to the student at the student system is controlled as is the rate of advancement through each presentation of the lesson. The student must "attend" the lesson for at least a specified amount of time. Such an audio controlling mechanism thus ensures that the student has participated in the lesson for at least the minimum time represented by the collective time required to play each of the audio files associated with each of the presentations of the lesson.

In another embodiment, a video file and video controlling means issued to control the pace of the lesson and advancement through the lesson. Alternately, a combination of audio and video files may be used to control the pace and advancement.

In yet another embodiment of the present invention, the educator provider system includes the ability to generate a lesson completion record upon completion of a lesson by a student at one of the at least one student systems connected to the network. Such a lesson completion record may comprise a certificate of completion that the student may store and print for acknowledgement of completion of the course. If the lesson includes tests (quizzes, questions, etc.), the educator provider system can qualify the record or certificate based on the number or percentage of correct/incorrect answers. In such instances, a record or certificate may not be generated if the student was not "successful" i.e., met the minimum requirements for the number or percentage of correct answers.

In still another embodiment of the present invention, the system includes an education authority system connected to the network. The education authority system may be operated by or for a governmental agency or professional organization charged with overseeing the completion of courses by certain classes of persons. For example, a state agency may be charged with ensuring that child care organizations maintain qualified personnel on their staff, with the qualifications for such personnel including completion of specific courses to become qualified, and/or completion of continuing education courses to remain certified.

The addition of the education authority system to the online education system of the present invention provides at least two additional benefits. First, all or a portion of the content of the lesson to be transmitted to student systems may be generated at the education authority system. The content generated by the education authority system may either be transmitted to the educator provider system for storage and subsequent transmittal to the student systems, and/or be accessed by the educator provider system when transmitting a lesson to a student system. In the latter scenario, the educator provider system acts as a conduit for the lesson content residing at the education authority system.

The second advantage of the addition of the education authority system is the fact that the lesson completion record may be transmitted by the educator provider system to the education authority system. In this manner, the education authority will be apprised of successful completion by a student in near real time. This timely notice may be particularly important where the student completes the course shortly before a deadline imposed by the education authority or appropriate regulating authority.

BRIEF DESCRIPTION OF THE DRAWINGS

FIG. 2 shows a screen printout at a student system of the login screen according to one embodiment of the present invention.

FIG. 4A and FIG. 4B collectively show a screen printout of the system configuration screen according to one embodiment of the present invention.

FIG. 5A and FIG. 5B collectively show a screen printout of the screen giving instructions for loading an audio plug-in according to one embodiment of the present invention.

FIG. 12 shows a screen printout of the certificate of completion displayed to the student upon successful completion of the course according to one embodiment of the present invention.

DETAILED DESCRIPTION OF THE INVENTION

Figure 1:
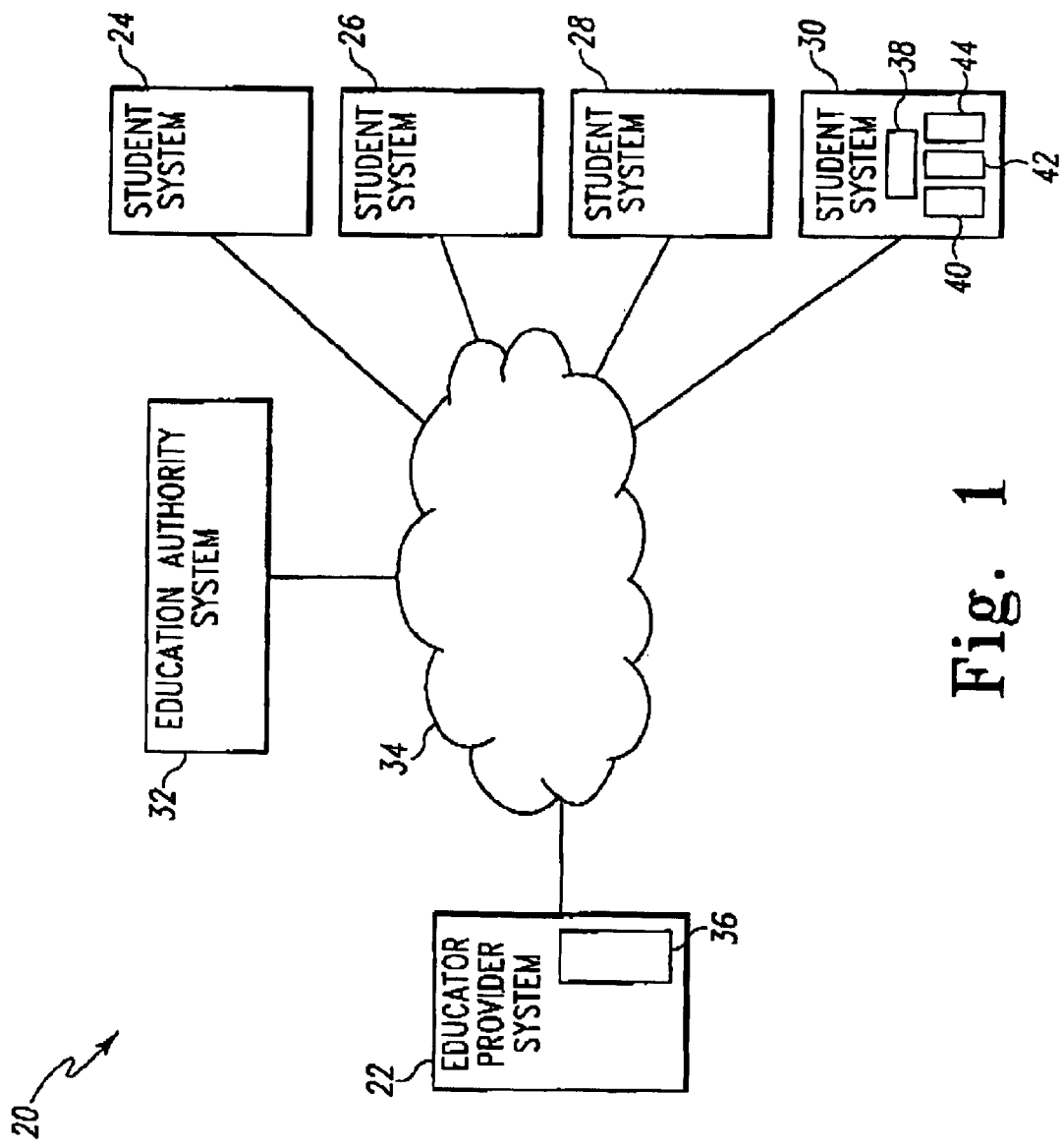
FIG. 1 shows a diagrammatic view of one embodiment of the online education system of the present invention.

Referring now to FIG. 1, there is shown a diagrammatic view of one embodiment of the online education system of the present invention. In this embodiment, online education system 20 includes educator provider system 22, first student system 24, second student system 26, third student system 28, fourth student system 30, education authority system 32, and network 34. Educator provider system 22 generally belongs to a party (educator) offering online courses or lessons, or to a third party who makes such courses or lessons available on behalf of the educator. Student systems 24, 26, 28, and 30 are used by one or more students desiring to take the educator's courses or lessons online.

Education authority system 32 generally belongs to an organization having an interest in ensuring that students take the courses or lessons offered by the educator. An education authority may be a professional organization or governmental agency, for example. In a state in which child care providers are required by the state to take certain courses to become and/or remain certified to provide child care services in that state, the education authority is the governmental agency or contracted firm designated to oversee such certification. In another state, a state charged board of examiners oversees completion of continuing legal education requirements by lawyers. That board of examiners is an education authority. The education authority also could be comprised of multiple organizations cooperating in the provision of education or education accreditation, or to an entity owning or operating a number of educational centers.

Thus, online education system 20 permits an educator provider to present courses or lessons to students. With the use of network 34, such access may be from any location in which student systems 24, 26, 28, or 30 are located, and at any time. This general configuration of FIG. 1 is sometimes referred to as "distance learning" due to the elimination of time and spatial requirements for class location.

Education authority system 32 is optional, as is explained in greater detail below. Courses and/or lessons, and any or all of the content thereof, may originate from education authority system 32, educator provider system 22, or another source involved in development of courses and/or lessons suitable for distance learning.

Returning to FIG. 1, in this embodiment, educator provider system 22 includes server 36. Server 36 permits educator provider system 22 to connect to network 34 and manages the presentation of courses and/or lessons to students over network 34.

Each student system 24, 26, 28, and 30 may be of various configurations well known in the art. Fourth student system 30 is shown having processor 38, keyboard 40, monitor 42, and printer 44. Processor 38 manages communication with the network 34 and manages input and output from keyboard 40, monitor 42, and printer 44. Keyboard 40 is exemplary of an input device, serving as a means for a student to input information to student system 30. Other input devices, such as a mouse, are contemplated to be within the scope of the invention.

Monitor 42 serves as a visual display means to display the courses and/or lessons to a student using student system 30. Printer 44 serves as a means to display courses and/or lessons and to print lesson completion records and/or electronic certificates, as is explained in greater detail herein. Each student system 24, 26, 28, and 30 may comprise other devices known in the art for bidirectional communication over a network. For example, the use of a personal hand held device, such as a Palm™ Pilot™, a laptop computer, and a telephonic device, such as a telephone, are contemplated to be within the scope of the invention. Each student system 24, 26, 28, and 30 must be capable of receiving audio signals or files for reasons explained herein below.

Educator authority system 32 may be any system capable of communicating with network 34. Like educator provider system 22, it may comprise a server, keyboard, mouse, monitor, printer, etc., as is well known in the art.

Network 34 is of the type to permit bidirectional communication between educator provider system 22 and student systems 24, 26, 28, and 30. In one embodiment, network 34 comprises the global network known as the Internet. Network 34 may, however, comprise other network means permitting bidirectional communication, or combinations of such network means as are well known in the art. A local area network, wide area network, telecommunications wire and/or fiber networks, and satellite communications networks are just a few examples of alternate network means well known in the art and contemplated to be within the scope of the invention.

Before discussing the operation of online education system 20, the course and/or lesson taught through online education system 20 is worthy of discussion. As used herein below and in the claims, the term "lesson" refers generally to any instruction unit and/or combination of instructional units. Each instructional unit may comprise one or more presentations. Each presentation is a frame/page/screen of content presented to a student. A lesson may comprise text, graphics, videos, photographs, audio content or other content well known in the art, and any combination of one or more of these various types of content. A lesson can be generated in whole or in part by educator provider system 22, education authority system 32, and/or by any third party system, or by a combination of systems and sources. The term "course" is sometimes used in the following text, and is to be synonymous with "lesson".

In the embodiment whose operation is described herein below, the content of the lesson illustrated was generated by a third party system and educator provider system 22. By means well known in the art, HTML pages were generated for the lesson, with the HTML pages containing all content except audio content. For each HTML page, which constitutes a "presentation" of the lesson, at least one audio file was generated and associated with at least one of the HTML pages. Such audio files are in a format readable at student systems 24, 26, 28, and 30 by use of a browser plug-in such as MACROMEDIA® SHOCKWAVE® by Macromedia, Inc.

The use of HTML and MACROMEDIA® SHOCKWAVE® is conducive to an environment where network 34 comprises the Internet, and where each student system 24, 26, 28, and 30 has a browser, such as Microsoft Corporation's INTERNET EXPLORER® or Netscape Corporation's NETSCAPE, residing thereon together with the MACROMEDIA® SHOCKWAVE® plug-in. With this configuration, each student system 24, 26, 28, and 30 is capable of receiving the lesson, allowing the student to interact with the lesson, and allowing the student to be in bidirectional communication with educator provider system 22.

It will be appreciated by those of skill in the art that the audio streaming capability may be built into the browser, such as has been announced to be included in future versions of INTERNET EXPLORER® and NETSCAPE®. Regardless of the structure of the software and/or hardware operating on each student system 24, 26, 28, and 30, it is key that the software and/or hardware include the ability to read and play the audio file(s) associated with the pages of the lesson to serve as an audio controlling mechanism.

Referring now to FIG. 2, there is shown a screen printout at student system 30 of the login screen according to one embodiment of the present invention. In this embodiment, the login screen is located on the Internet at the web address of Professional Training and Consulting, Inc., which provides a student accessing such page with access to educator provider system 22. The login screen of FIG. 2 provides input fields for a User ID and Password at User ID field 40 and Password field 42, respectively. Valid User IDs and Passwords may be provided to the student from the educator provider, the education authority, or third party educator, but obviously must be recognizable by educator provider system 22. Generally, the student must be pre-approved by an educator, for the present invention permits for offering of credit to the student. Further, pre-approval may be desired to ensure payment by the student for the training provided.

The login screen of FIG. 2 also contains "Forgot your password" button 44 for execution of a small program used to assist the student to remember his/her password, as is well known in the art. Clear button 46, when activated, clears any information entered in User ID field 40 and Password field 42. Log In button 48 may be activated by the student after the student enters his/her assigned User ID and Password to permit the student to proceed toward taking one or more lessons.

Figure 3:
FIG. 3 shows a screen printout of the course selection screen according to one embodiment of the present invention.

FIG. 3 shows a screen printout of the course selection screen according to one embodiment of the present invention. The course selection screen is displayed to a student at student system 30 after entry of a valid User ID in User ID field 45, entry of a valid password in Password field 47, and activation of Log In button 48 of the login screen illustrated in FIG. 2. Fourth student system 30 will be used as an exemplary student system in the discussion to follow, and is not intended to be limiting in any respect.

In the embodiment of FIG. 3, the student is only registered to take the course entitled, "Sensational Science". General information about the course is listed on this course selection screen. If the student is signed up for more than one course, additional courses would be displayed on the screen of FIG. 3. Similarly, if a student had started a course, but interrupted it, as is discussed in further detail herein, such an interrupted course would also be listed, with its status indicated as incomplete. For the student to begin to take the course "Sensational Science", he/she should activate Take Course button 50.

Figure 4B:

FIGS. 4A and 4B collectively show a screen printout of the student system configuration screen according to one embodiment of the present invention. The configuration screen of FIGS. 4A and 4B is displayed at student system 30 upon activation of Take Course button 50 of FIG. 3. The configuration screen is useful to notify the student of the requirements of student system 30 for the Sensational Science Course. Note that the requirements listed in FIG. 4A include a "sound card", "speakers," and "MACROMEDIA SHOCKWAVE® 8". These requirements go to the audio controlling feature of the present invention.

FIGS. 5A and 5B collectively show screen printouts giving instructions for loading an audio plug-in according to one embodiment of the present invention. If it is determined at student system 30 by a Java script executing on the browser residing on student system 30 that student system 30 does not contain the audio plug-in, the instructions for installing the plug-in as shown in FIGS. 5A and 5B at student system 30 are displayed.

Referring now to FIGS. 6A, 6B, 6C, 6D, 6E, and 6F, there are shown screen printouts of portions of a lesson as presented to a student according to one embodiment of the present invention. As is well known in the art, the content of the lesson is controlled at educator provider system 22. The lesson is also interactive, allowing a student at student system 30 to enter information related to the lesson as is described in further detail herein.

The general elements of the presentations of FIGS. 3, 6A, 6B, 6C, 6D, 6E, and 6F are now discussed. Located at the top of each screen is header 60. In this embodiment, header 60 identifies the educator provider, namely "PTC Online Learning", operating educator provider system 22; the name of the course, namely, "Sensational Science"; and the type of browser, namely "Netscape", being used at student system 30. At subtitle 62, the name of the course, namely "Sensational Science", is displayed.

Two types of status information are also displayed in the lesson screens of FIGS. 6A–6F. Loading status bar 64 indicates the status of the loading of the content of the screen onto student system 30. Class status indicator 66 shows the status of lesson completion, i.e., the percentage of the lesson completed with this screen.

Several buttons are provided for activation by a student at student system 30 during the lesson. Those buttons include left arrow button 68, LOGOUT button 70, HELP button 72, and FORWARD or right arrow button 74.

Left arrow button 68 and right arrow button 74 allow the student to move back to the previous screen page or forward to the next screen page, respectively. As will be explained in further detail herein, in this embodiment, left arrow button 68 remains activatable throughout the display of the page, while right arrow button 74 is only activatable upon completion of the presentation, both visual and auditory, of the presently displayed screen.

HELP button 72, activatable throughout the display of the page, if activated by the student, takes the student to help pages, as is well known in the art. These help pages may, for example, give the student information about the buttons on the screen, troubleshooting tips, and/or the opportunity to contact the educator provider.

LOGOUT button 70, activatable throughout the display of the page, if activated by the student, allows the student to interrupt the current course by logging out. If the student logs out, educator provider systems 22 keeps track of the location in the lesson at which the student logged out. Later, the student may resume a partially completed lesson by logging in as described above in association with FIGS. 2 and 3 above.

Another button, Replay Audio button 76, is present on each of the screens shown in FIGS. 6A–6F. Activation of Replay Audio button 76 initiates a replay of the audio file(s) transmitted as part of the lesson for the particular screen displayed. The significance of these audio file(s) will be discussed later herein.

Figure 6A:
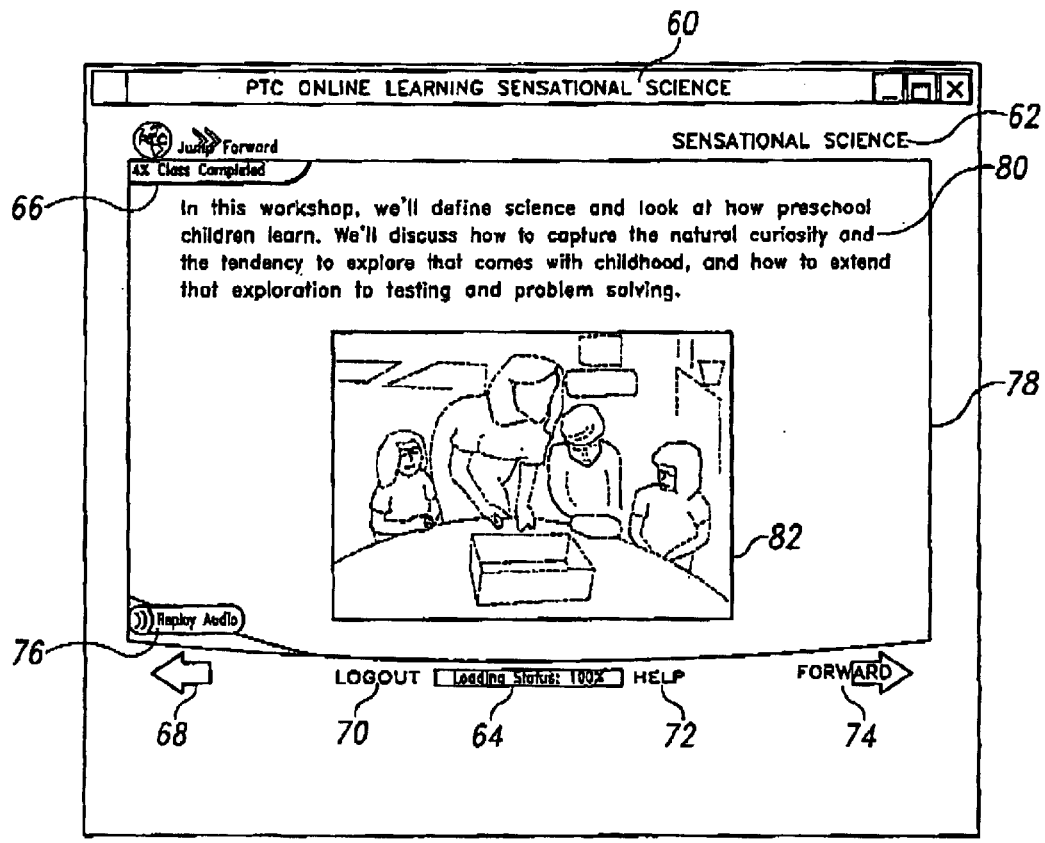
FIG. 6A, FIG. 6B, FIG. 6C, FIG. 6D, FIG. 6E, and FIG. 6F each show screen printouts of portions of a lesson as presented to a student at a student system in accordance with one embodiment of the present invention.
Figure 6B:
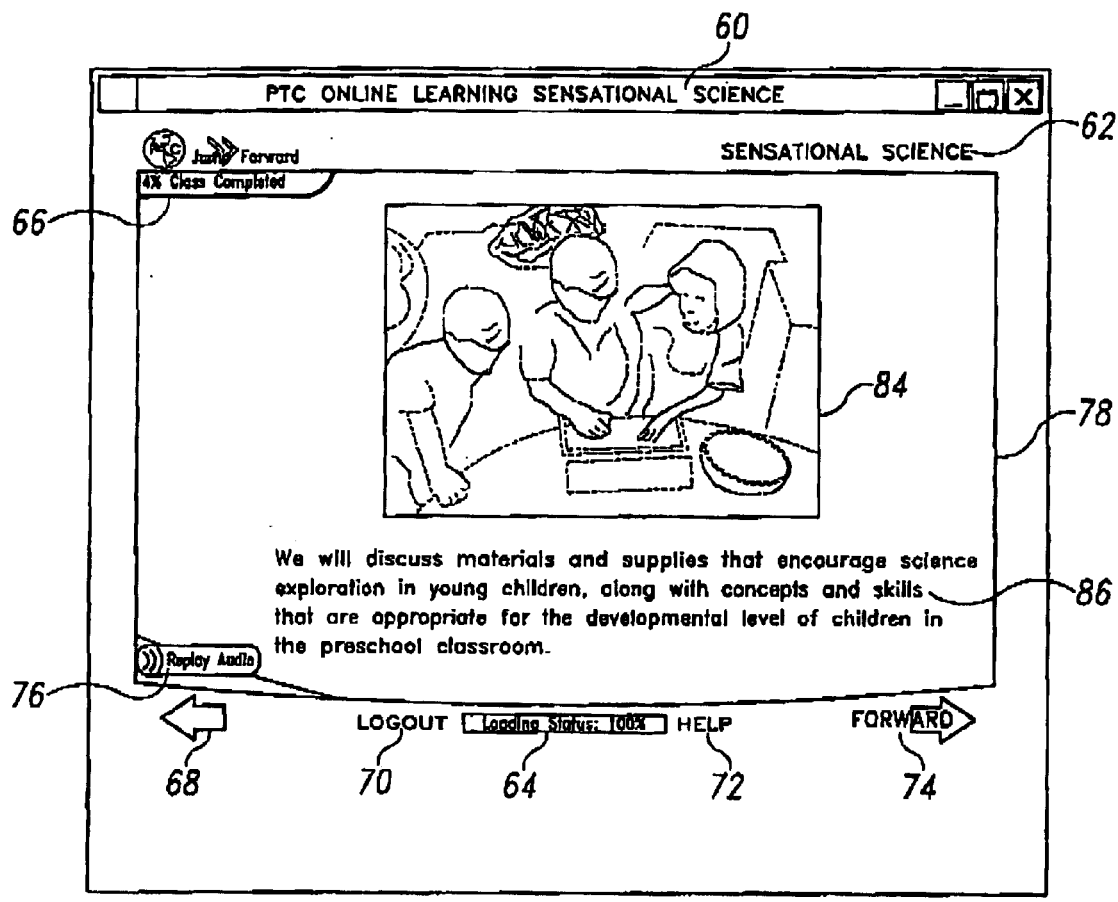
Figure 6C:
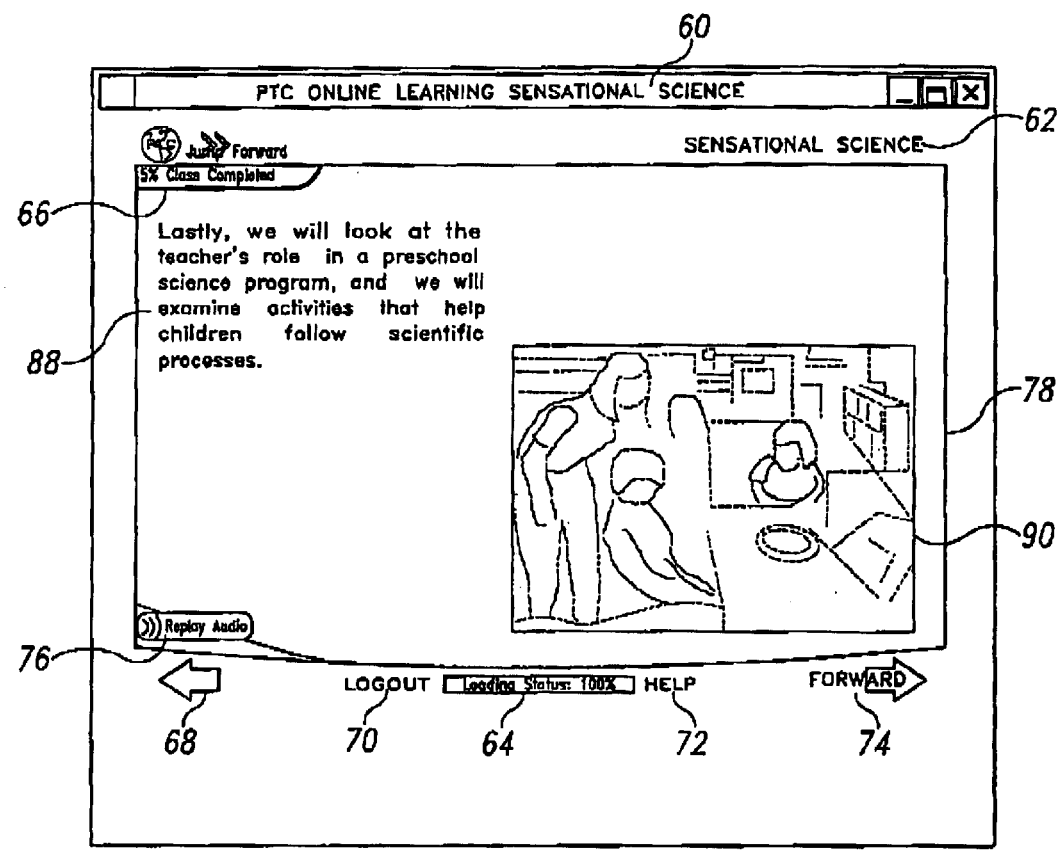
Figure 6D:
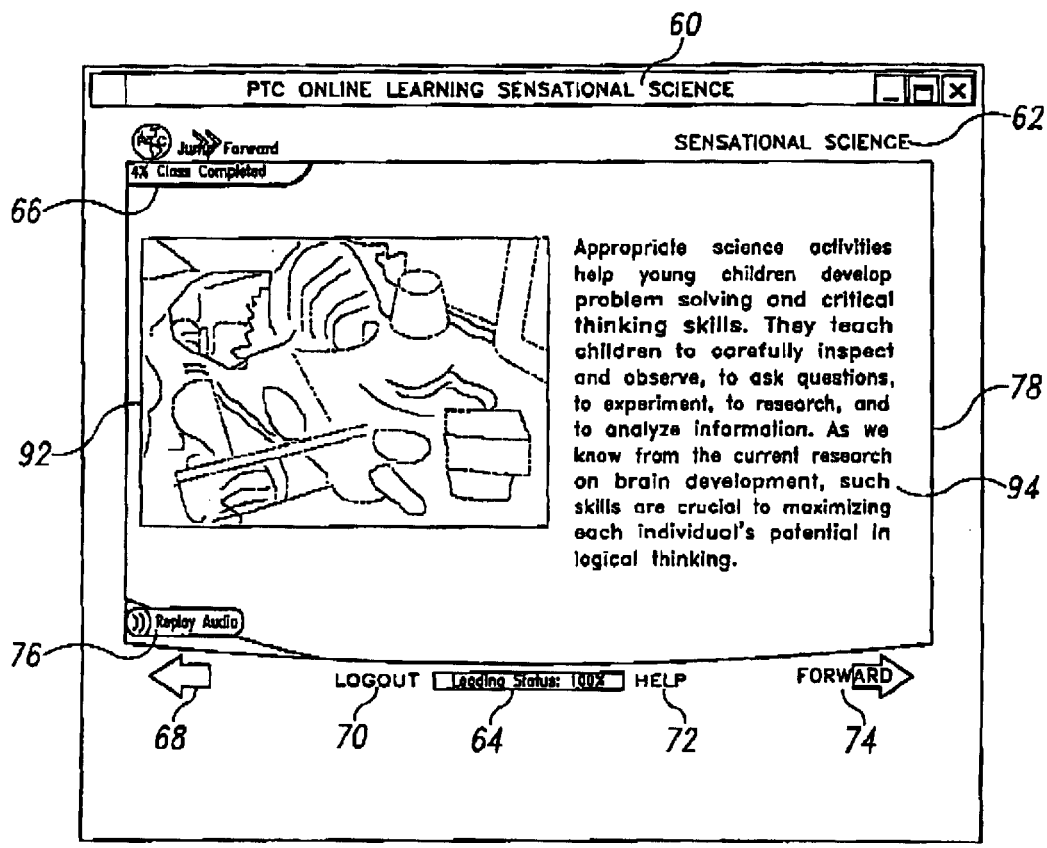
Figure 6E:
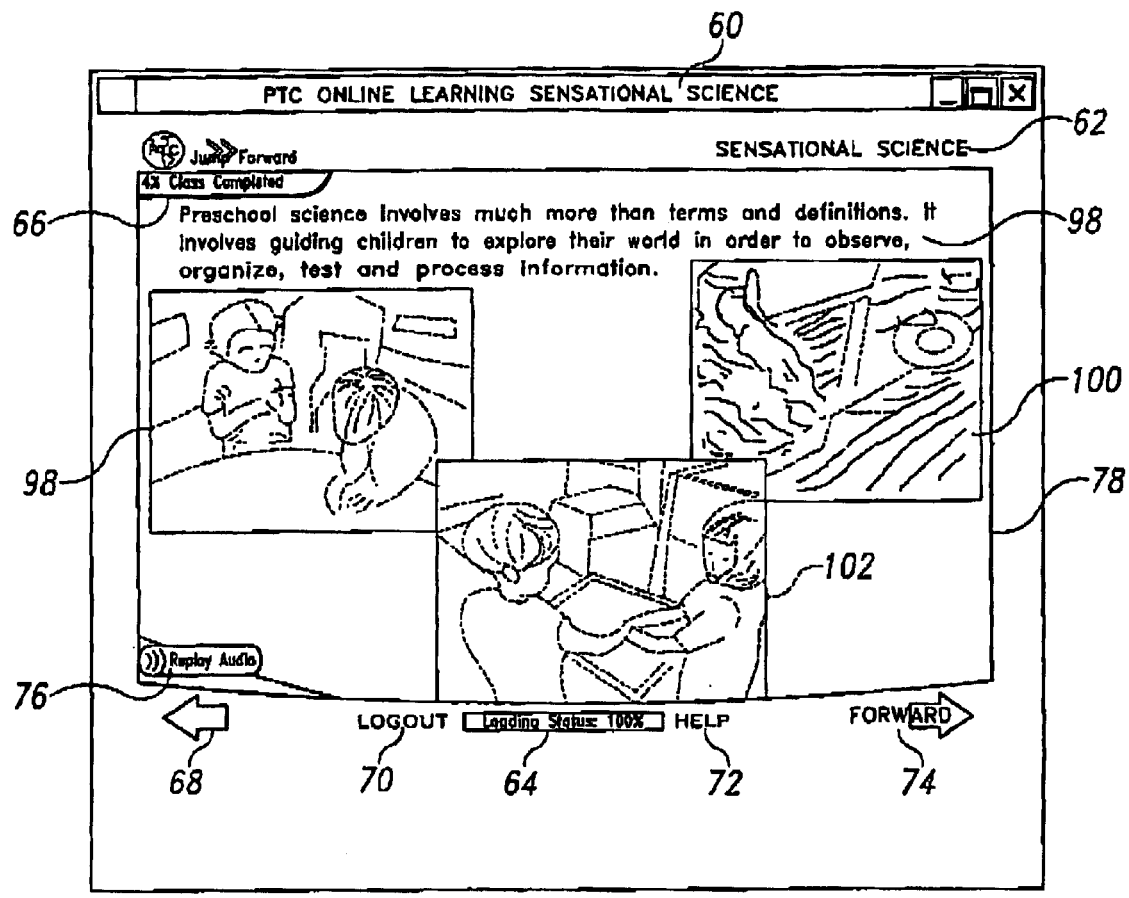
Figure 6F:
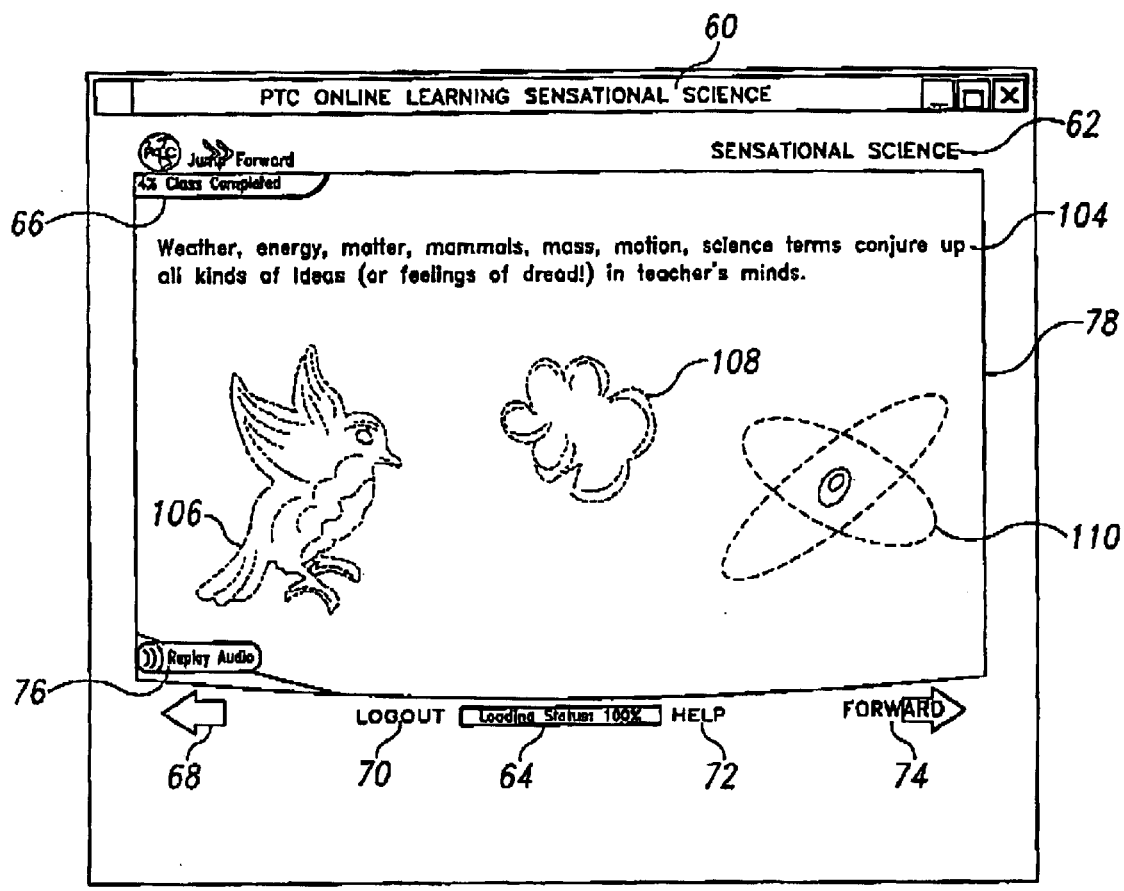

Each lesson page/screen (presentation) of the screens of FIGS. 6A–6F is comprised of a screen area designated in these FIGS. 6A-6F as content screen area 78. Within content screen area 78 is the content for that particular portion of the lesson. Content screen area 78 of FIG. 6A is comprised of first text portion 80 and first photograph 82. Content screen area 78 of FIG. 6B is comprised of second photograph 84 and second text portion 86. Content screen area 78 of FIG. 6C is comprised of third text portion 88 and third photograph 90. Content screen area 78 of FIG. 6D is comprised of fourth photograph 92 and fourth text portion 94. Content screen area 78 of FIG. 6E is comprised of fifth text portion 96, and of fifth, sixth and seventh photographs 98, 100, and 102, respectively. Content screen area 78 of FIG. 6F is comprised of sixth text portion 104, and first, second, and third graphics 106, 108, and 110, respectively.

As is illustrated by FIGS. 6A–6F, content screen area 78 may contain content from various sources, including but not limited to text, photographs, and graphics. It will be appreciated by those of skill in the art that videos or other content well known in the art may also be placed into content screen area 78. The only limitation to the content within screen area 78 is to ensure that educator provider system 22 be able to transmit such content and student system 30 be able to receive such content in a manner that allows a student using student system 30 to comprehend the content with student system 30.

The present invention also requires that the content of at least one lesson page/screen has associated therewith at least one audio file. The audio file(s) is (are) used to control the pace and rate of advancement of the presentation of the lesson pages having audio associated therewith, and, subsequently, of the entire lesson. A student will not be able to logout using LOGOUT button 70 or to advance to the next screen/page using right arrow button 74 until the at least one audio file for that screen/page has completed playing at student system 30. This "playing" of the audio file(s) is achieved using the MACROMEDIA SHOCKWAVE® plug-in previously described in connection with this embodiment of the invention.

It will be appreciated by those of skill in the art that not every lesson page/screen need have an audio file. However, it is the audio files present which control the pace and rate of a document through the lesson.

The audio file(s) for a screen may be tied to content presented on content screen area 78. In the embodiment of FIGS. 6A–6F, a single audio file is used for each screen, with that audio file comprising a reading of text portions 80, 86, 88, 94, 98, and 104, respectively, of these FIGS. 6A–6F. Such audio files are therefore instructive in addition to being used to control the pace of the lesson. Thus, for a student to proceed in order through the screens of FIGS. 6A–6F, the screen of FIG. 6A is displayed and the audio file reading first text portion 80 is played to completion. After a complete playing of the audio file associated with the content of FIG. 6A, the student may activate right arrow button 74 on FIG. 6A to proceed to the screen of FIG. 6B. The screen of FIG. 6B is displayed and the audio file reading second text portion 86 of FIG. 6B is played to completion. The student may then proceed to the screen of FIG. 6C by activating right arrow button 74 of FIG. 6B. The screen of FIG. 6C is displayed and the audio file reading third text portion 88 of FIG. 6C is played to completion. The student may then proceed to the screen of FIG. 6D by activating right arrow button 74 of FIG. 6C. The screen of FIG. 6D is then displayed and the audio files reading fourth text portion 94 is played to completion. The student may then proceed to the screen of FIG. 6E by activating right arrow button 74 of FIG. 6D. The screen of FIG. 6E is then displayed and the audio file reading fifth text portion 98 of FIG. 6E is played to completion. The student may then advance to the screen of FIG. 6F by activating right arrow button 74 of FIG. 6E. The screen of FIG. 6F is then displayed and the audio file corresponding to sixth text portion 104 of FIG. 6F is then played to completion. The student may then proceed by activating right arrow button 78 of FIG. 6F.

At any time during the display of any of the screens of FIGS. 6A to 6F, the student may select left arrow button 68 to return to the previously displayed screen, LOGOUT button 70 to logout from the lesson, or HELP button 72 for help or troubleshooting information.

It will be appreciated by those of skill in the art that the use of an audio file for a screen in this manner helps to ensure that the student has taken the requisite time in taking the course. It will also be appreciated that the audio file(s) associated with any screen need not be a reading of text displayed on that screen. If a content element is a video with sound, then the sound of the video may comprise the audio file for that screen. Alternatively, the content may comprise audio apart from a particular content element on the screen. The audio file(s) do not have to be a reading. Music, sound effects, and any other combination of auditory tones are considered to be within the scope of the invention.

It will also be appreciated that time restrictions other than those associated with the time to play the audio files maybe employed with the system and method of the present invention. For example, the student may be required to advance, seek help, or logout within a prescribed period of time after completion of the playing of the audio file(s) associated with a page of the lesson.

Figure 7:
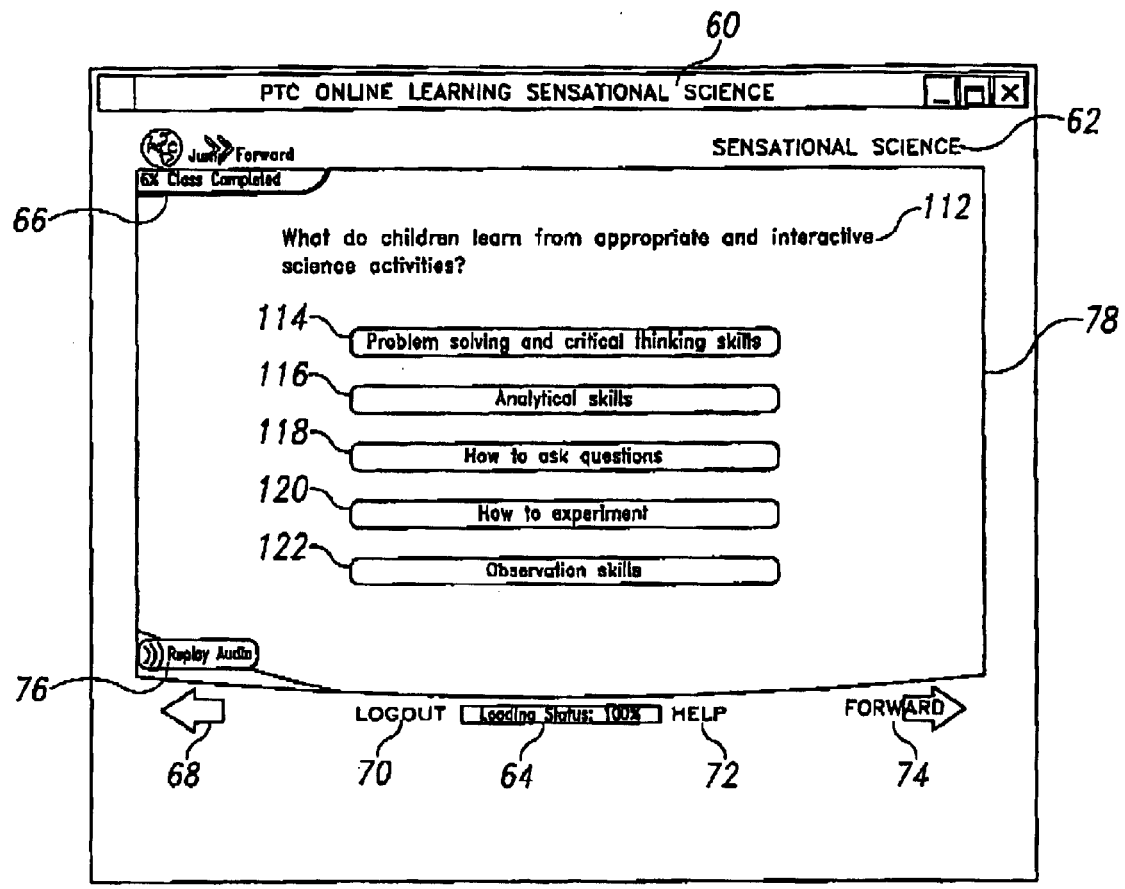
FIG. 7 shows a screen printout of a summary page of a lesson in accordance with one embodiment of the present invention in which the materials of FIGS. 6A–6F have been summarized.

Referring now to FIG. 7, there is shown a screen printout of a summary page of a lesson in accordance with one embodiment of the present invention. The summary screen of FIG. 7 is displayed after the student activates right arrow button 74 of FIG. 6F, and summarizes the content of the screens of FIGS. 6A, 6B, 6C, 6D, 6E, and 6F. A question is posed in seventh text portion 112, with possible answers in boxes 114, 116, 118, 120, and 122. Referring to fourth text portion 94 of FIG. 6D, one can determine that all of the answers set forth in boxes 114, 116, 118, 120, and 122 are correct answers to the question posed in seventh text portion 112.

FIGS. 8A, 8B, 8C, 8D, and 8E each show a screen printout of portions (presentations) of a lesson in accordance with one embodiment of the present invention. Like the lesson portions of FIGS. 6A–6F, content screen areas 78 of FIGS. 8A–8E are composed of different types of contents, including text, graphics, and photographs. As is evident from review of the text printed on content screen areas 78 of FIGS. 8A–8E, this portion of the lesson discusses a topic referred to as "Informal Science".

Figure 8A:
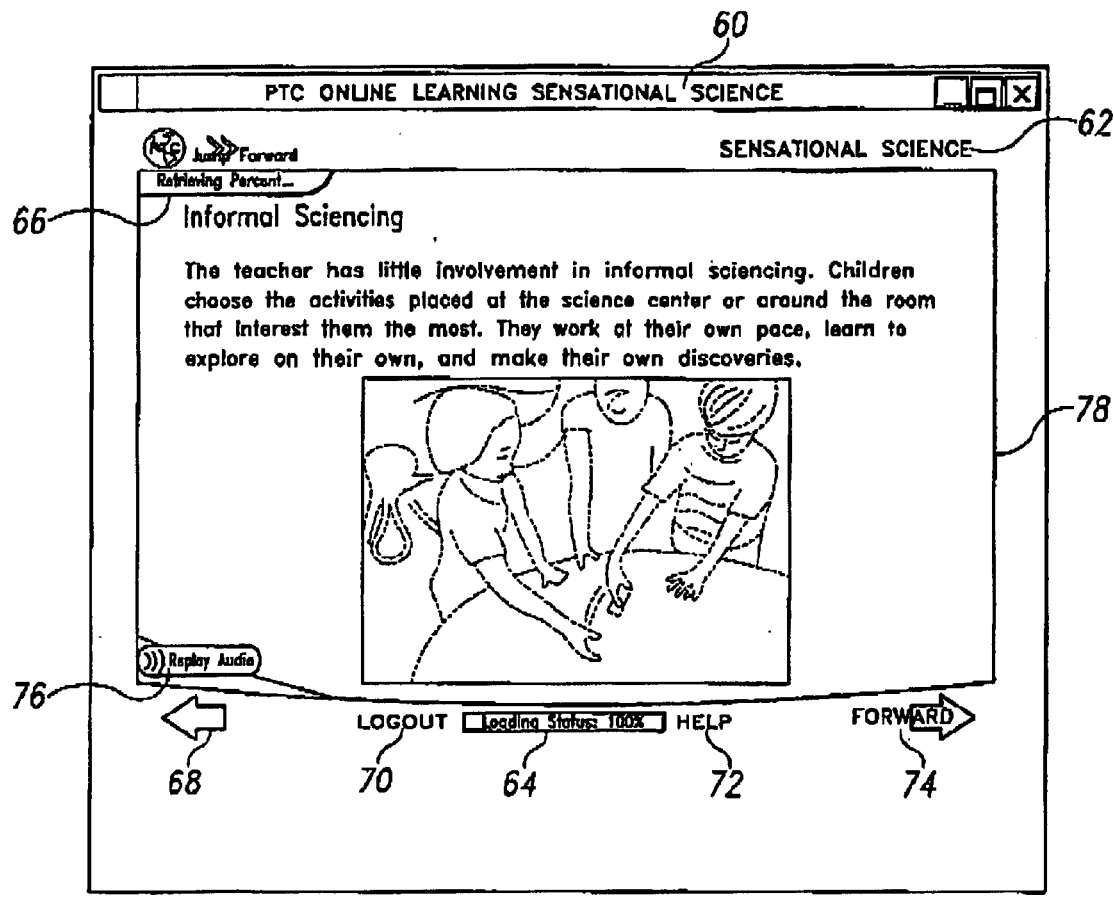
FIG. 8A, FIG. 8B, FIG. 8C, FIG. 8D, and FIG. 8E each show screen printouts of portions of a lesson in accordance with one embodiment of the present invention.
Figure 8B:
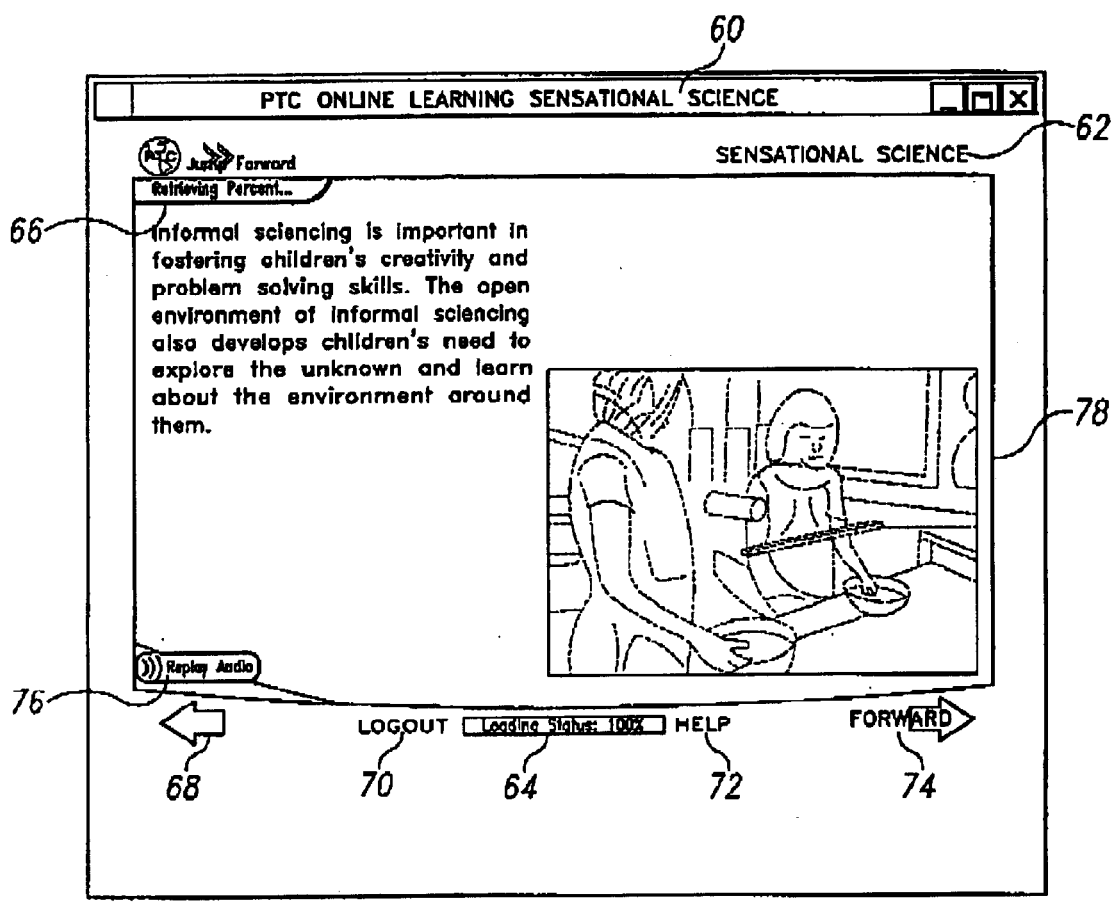
Figure 8C:
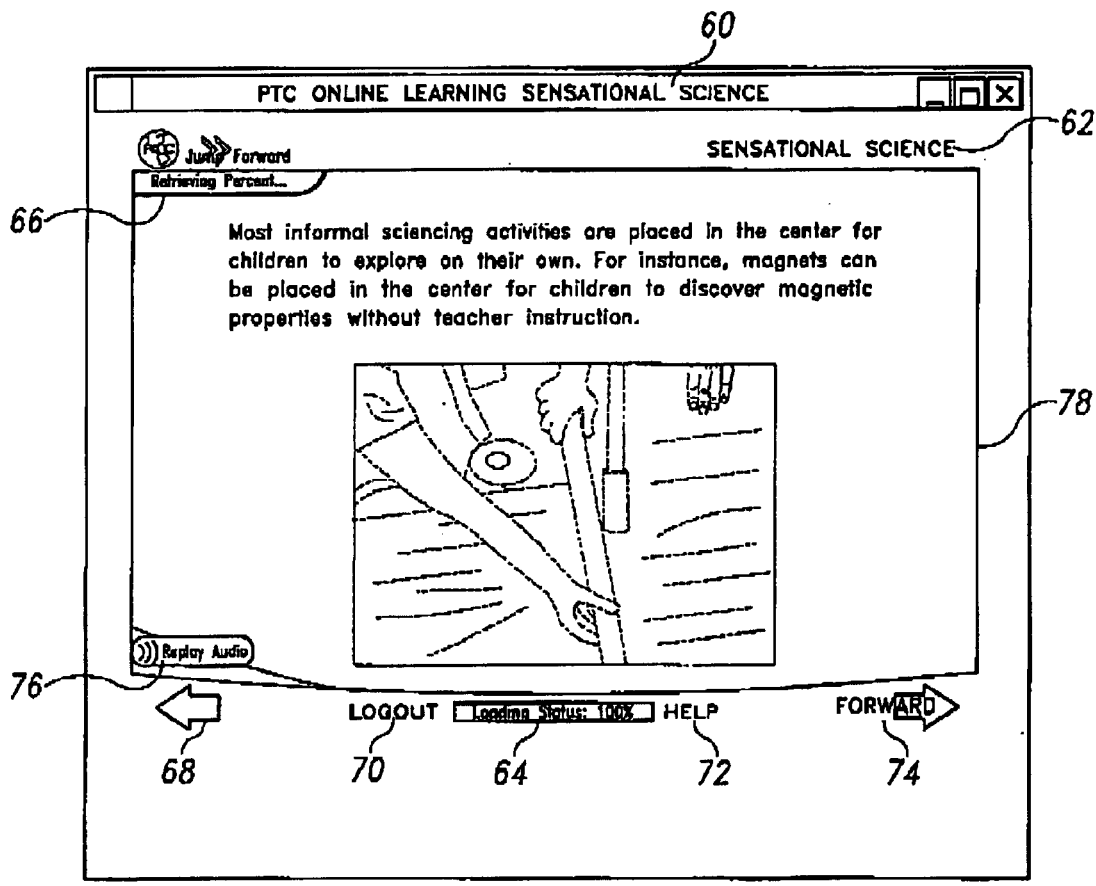
Figure 8D:
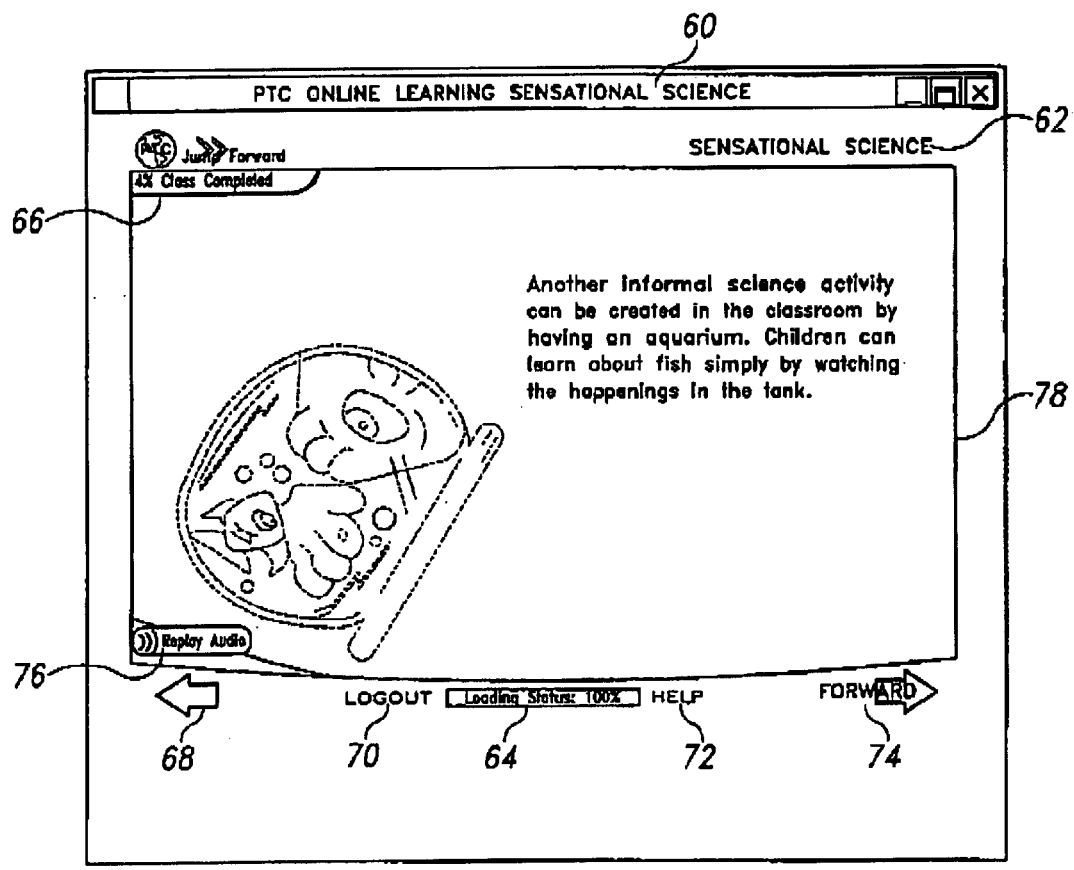
Figure 8E:
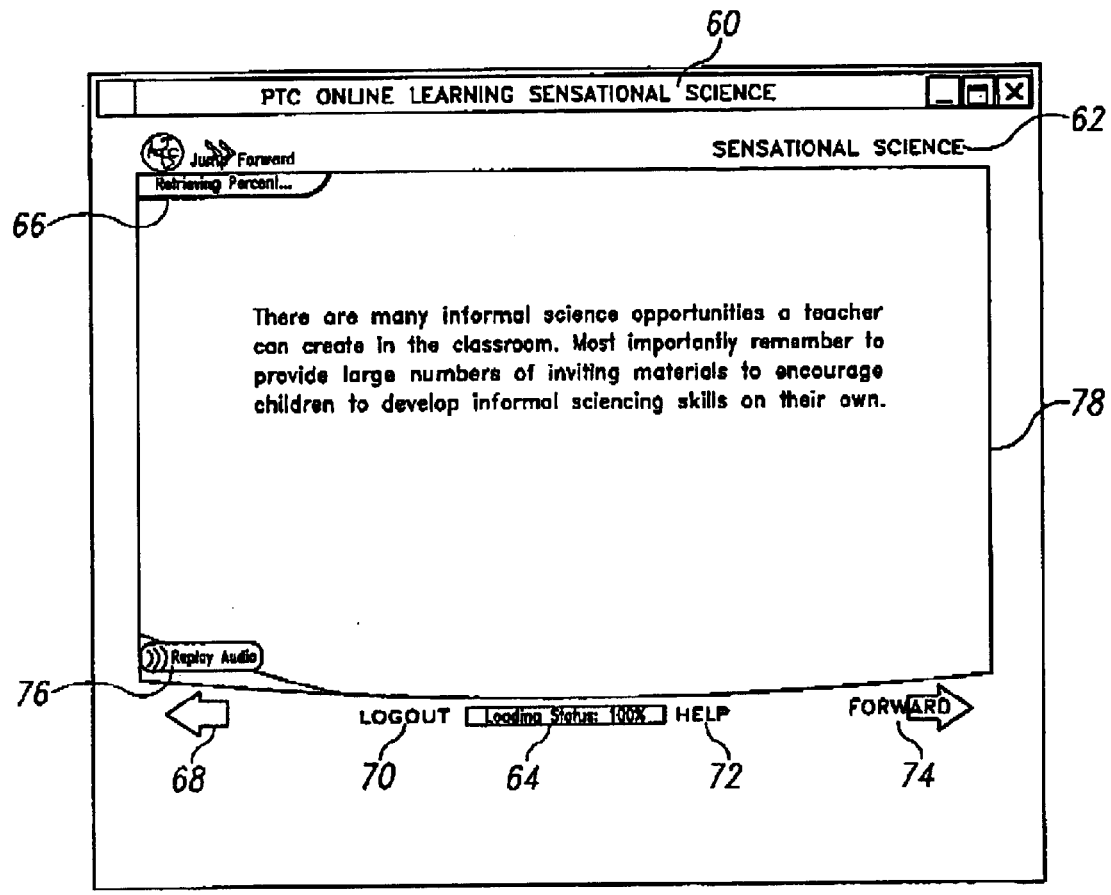
Figure 9:
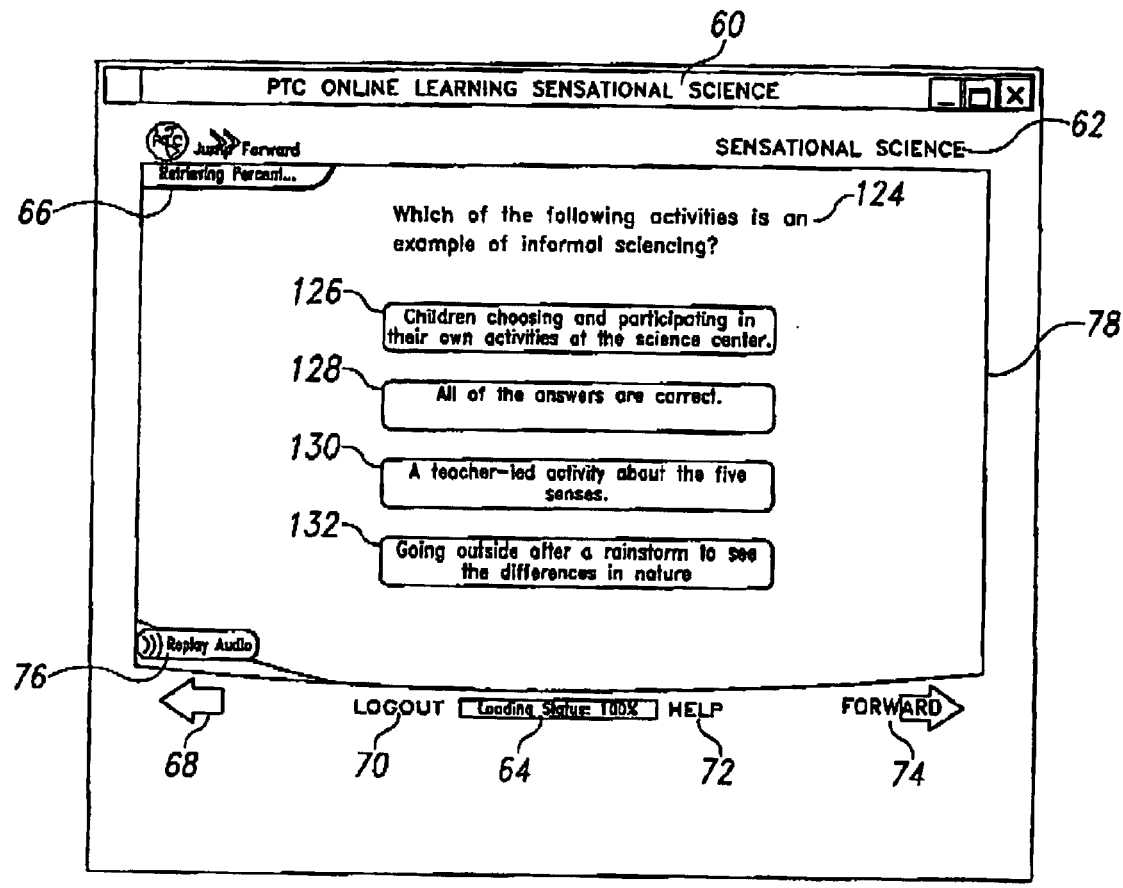
FIG. 9 shows a screen printout of a test page based on the material presented in FIGS. 8A-8F in accordance with one embodiment of the present invention.
Figure 10:
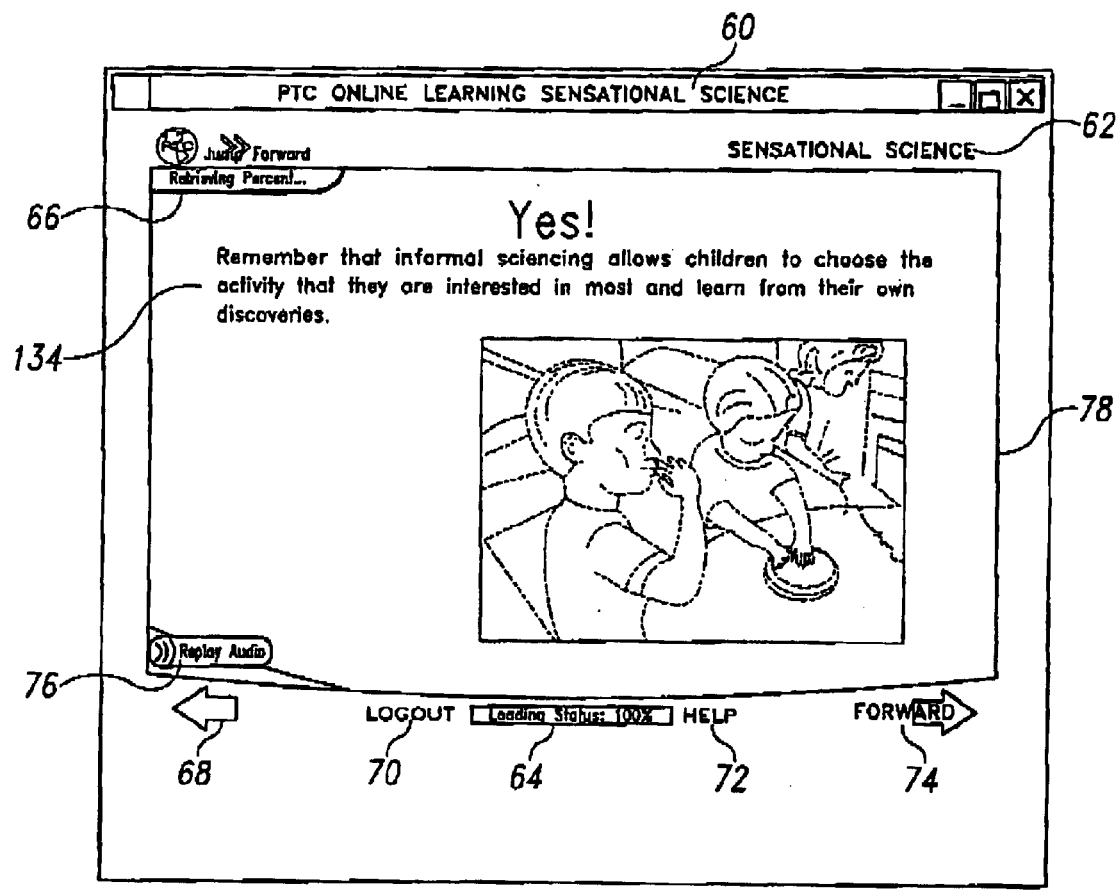
FIG. 10 shows a screen printout of a screen displayed when the student selected the correct answer in FIG. 9, according to one embodiment of the present invention.

Referring now to FIG. 9, there is shown a screen printout of a test page based on the material presented in FIGS. 8A–8E in accordance with one embodiment of the present invention. The student is asked the question "Which of the following activities is an example of informal sciencing?" in eighth text portion 124. Four possible answers are set forth in answer boxes 126, 128, 130, and 132. The correct answer, as shown in FIG. 8A, is found in answer box 126. If the student selects (activates) answer box 126, the screen of FIG. 10 is displayed. In FIG. 10, ninth text portion 134 indicates that the student has selected the correct answer and restates the concept of informal science as set forth in FIGS. 8A–8E.

It will be appreciated by those of skill in the art that if test presentations, such as that of FIG. 9, are used in the lesson, educator system 22 can monitor and analyze the answers given by the student by means well known in the art. Such analysis may include for example, determination of whether the student is simply guessing. Such monitoring and analysis may indicate that the student did not successfully complete the lesson in accordance with standards preset for the lesson.

Figure 11:
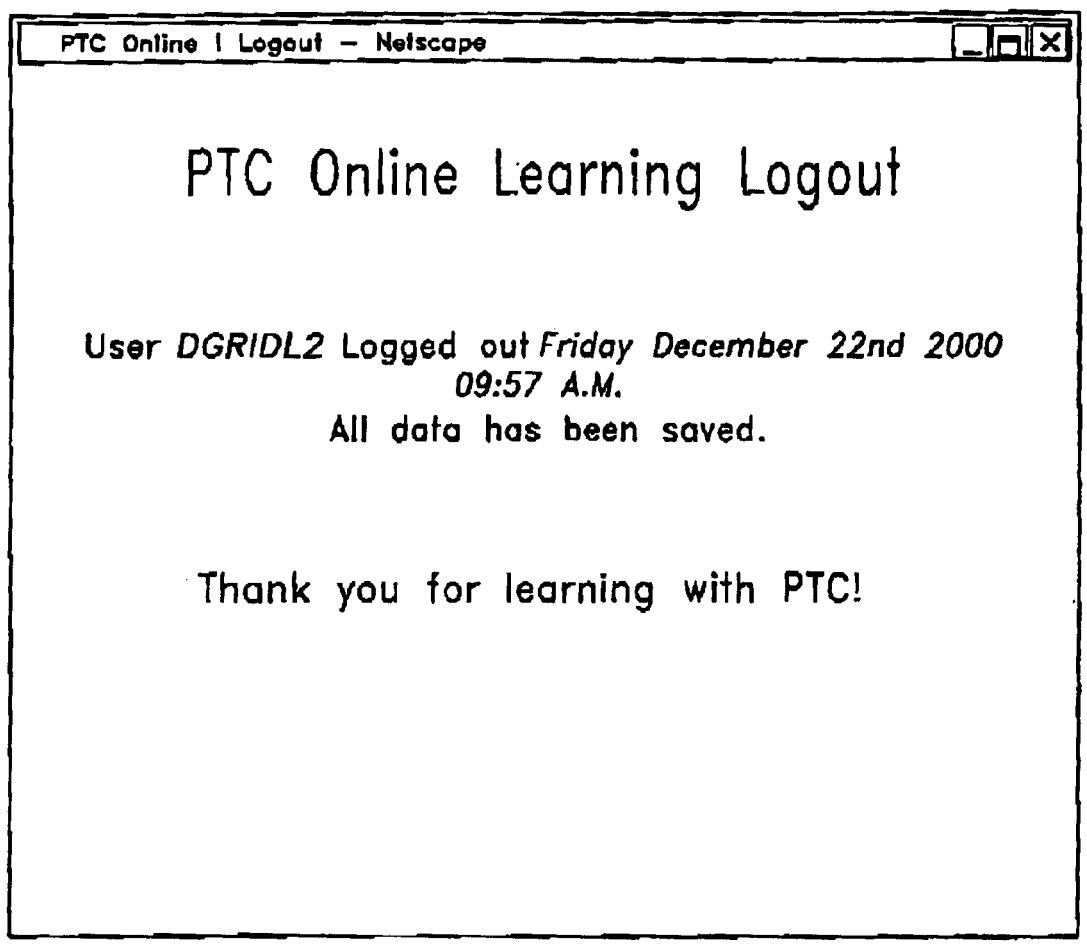
FIG. 11 shows a screen printout of a logout screen displayed in response to the student selecting the Logout button in accordance with one embodiment of the present invention.

FIG. 11 shows a logout screen according to one embodiment of the present invention. FIG. 11 would be displayed if the student activates LOGOUT button 70 at any point during the lesson, such as in FIGS. 6A–6F, 7, 8A–8E, 9, or 10. If the lesson has not been completed, educator system 22 keeps track of the location (screen) in the lesson where the student logged out. When the student returned to the lesson in the manner described in association with FIGS. 2 and 3, educator system 22 returns the student to the logout point previously stored by educator system 22.

Referring now to FIG. 12, there is shown a screen printout of a certificate of completion made available to the student. Upon "listening" to every page/screen of the lesson and answering a sufficient number of questions correctly, a screen similar to that of FIG. 12 is displayed.

Certificate of completion 150 specifies the name of the educator provider, in this case, Professional Training and Consulting, Inc. The name of the student, Doreen J. Gridley, is also displayed. In certificate 150, seal 152 and signature 154 are also displayed. The student may print certificate 150 to printer 44 of student system 30 by activating Print Certificate button 156. The student may also store certificate 150 by invoking save screen mechanisms made available on the browser of student system 30.

It may be desirable to send the student an official certificate as well. Such could be performed by the educator provider, and or the education authority by regular mail, facsimile, etc.

System 20 also permits for a completion record and/or an electronic version of the certificate of completion to be sent by educator provider system 22 to the applicable education authority system 32. A sample completion record may be composed of the following information:

Student name

Student identifier (as recognized by the education provider)

Course identifier

Number of credits

Date completed

Time completed

Number of correct answers

The exact content of the completion record is likely to be determined by the education authority and the format of the content record must be legible by education authority system 32, either directly or by access through an interface, for example.

In one embodiment, the completion record includes a course instance identifier assigned by system 20. A course instance identifier is a unique alphanumeric representation used to authenticate the completion record, and any certificate generated. The course instance identifier can be used to validate the completion record at education authority system 22 if a schema for the course instance identifier is recognized by education authority system 22. In this manner, it is difficult for a hacker to send a valid completion record to education authority system 22.

It will be appreciated by those of skill in the art that the electronic certificate of completion available to the student allows the student to obtain official acknowledgement of successful completion in an expeditious manner. Provisions of a completion record and/or certificate of completion to education authority system 32 informs the applicable education authority of the student's success so that official recognition by the education authority is possible immediately following completion of the course.

It will also be appreciated that other mechanisms may be implemented to insure successful completion before a completion record or certificate is generated by the system of the present invention. For example, testing can be used to insure comprehension of presented material. Also, the student may only be permitted a specified number of attempts to get a sufficient number of correct answers before deemed to have failed the course. The system may also only permit a specified number of interruptions/restarts before deeming that the student has failed the lesson.

In another embodiment of the present invention, video controlling mechanisms akin to the audio controlling mechanisms described above are used to control the pace and advancement of the lesson. In this embodiment, at least one presentation of the lesson includes at least one video file. Each student system 24, 26, 28, and 30 of FIG. 1 must therefore include the ability to play a video. Such capability is achieved in one embodiment by the use of the Real Video™ plug-in together with the Internet browser residing on the student system, or, alternatively, the browser may include the ability to read video files without necessitating a plug-in.

Referring to FIGS. 6A, 6B, 6C, 6D, 6E, and 6F, in the embodiment where video controlling is used to control pace and advancement of the lesson, a student is unable to logout using LOGOUT button 70 or to advance to the next screen using right arrow button 74 until the video file(s) associated with that screen/page has completely played at student system 30. The video file(s) for a screen/page (presentation) may be tied to content presented on content screen 78.

It will be appreciated by those of skill in the art that the pace of the lesson and advancement of presentations may be controlled by audio controlling, video controlling, or any combination thereof. At least one audio file and/or at least one video file must be present for control of presentation by the audio controlling means and/or video controlling means of system 20.

It will be further appreciated by those of skill in the art that the online education system and method of the present invention offers the advantages of "distance learning", as is well known in the art. In addition, however, the present invention, by use of the audio and/or video controlling mechanism of the present invention, the system provides a means by which the student is required to "attend" the lesson for a specified period of time. In particular, the student must "attend" the class for a time at least equal to the time required to play the audio file(s) and/or video file(s) associated with the lesson. Further, the ability of the educator provider system to generate a lesson completion record and transmit the same to the student system and/or to the education authority system, provides immediate feedback and acknowledgement to the student and/or education authority. Such acknowledgement may be critical if the student completes the lesson at a time near the deadline imposed by the education authority or regulating authority.

In addition to the audio and video controlling and lesson completion features, the present invention also provides a vehicle by which the student can interrupt, or leave, a lesson, and return to the point of interruption in the future. This feature is accomplished by storing the interruption point at the educator provider system. Further, the educator provider system keeps track of the answers made to any tests given during the lesson. Not only are the test results necessary to ensure "successful" completion (if testing is required by the education authority), but the test results can also be analyzed to ascertain whether the student is paying attention to the lesson or merely making guesses. If the student is only making guesses, the student and/or education authority can be so notified and/or the student can be considered to have failed the lesson.

It will also be appreciated that, while the example of a course for a childcare provider or preschool educator is presented herein, the method and system of the present invention is not limited to such an application. The method and system of the present invention can be utilized for education of any type from any type of educational institutional. In addition to the other examples already discussed herein, the method and system of the present invention may be used by a company to train its employees or any subject, by a manufacturer to train its sales representatives, or by an automobile manufacturer to train dealers' service persons, for example.

The system and method of the present invention provides the educator with confidence in the integrity of the online lesson. Time requirements is guaranteed and satisfactory completion in all respects are measured by the present invention. Thus, by use of the system and method of the present invention, the educator need not be limited to no-credit or audit classes in an online environment. Instead, an educator can make available all of its initial (pre-service) and continuing (in-service) courses online to achieve the many benefits associated with distance learning.

We claim:

1. An online education system that guarantees that at least one student spends a specified amount of time on at least one lesson, the system comprising:
   an educator provider system for transmission of at least one lesson comprising an audio file wherein the at least one lesson comprises content and wherein the audio file is associated with the content of the at least one lesson;
   at least one student system capable of receiving the at least one lesson and presenting the at least one lesson to at least one student;
   network means for connecting the educator provider system with the at least one student system in bidirectional communication;
   such that when the at least one lesson is transmitted over the network means from the educator provider system to the at least one student system, the presentation of the at least one lesson is controlled by an audio controlling means based on the received audio file, so that the at least one student cannot advance in the at least one lesson until the audio file has completed playing.

2. The system of claim 1, wherein the educator provider system is capable of generating the at least one lesson.

3. The system of claim 1, further comprising:
   an education authority system connected to the network means.

4. The system of claim 3, wherein the education authority system is capable of generating the at least one lesson.

5. The system of claim 3, wherein the educator provider system includes means for generating a course completion record for transmission over the network means to the education authority system.

6. The system of claim 1, wherein the educator provider system includes means for generating an electronic certificate for transmission over the network means to the at least one student system.

7. The system of claim 5, wherein the at least one student system includes a printer, means for receiving the electronic certificate, and means for printing the received electronic certificate on the printer.

8. The system of claim 1, wherein the network means comprises a global network.

9. The system of claim 8, wherein the global network comprises the Internet.

10. The system of claim 9, wherein the at least one student system comprises an Internet browser.

11. The system of claim 10, wherein the audio controlling means comprises a browser plug-in suitable for use in streaming audio content over the Internet.

12. The system of claim 1, further comprising means for interrupting the at least one lesson.

13. The system of claim 12, further comprising means for tracking the point at which the at least one lesson was interrupted, and means for resuming the interrupted lesson at such recorded point.

14. The system of claim 1, wherein the at least one lesson comprises a plurality of presentations, at least one of the plurality of presentations having at least one audio file associated therewith.

15. The system of claim 14, wherein at least one of the plurality of presentations comprises a test for the student.

16. The system of claim 1, wherein the interactive lesson further comprises at least one video file, the system further comprising:
   a video controlling means for controlling presentation of the lesson based on the received at least one video file.

17. An online education system that guarantees that at least one student spends a specified amount of time on at least one lesson, the system comprising:
   an educator provider system for transmission of at least one lesson comprising at least one video file wherein the at least one lesson comprises content and wherein the at least one video file is associated with the content of the at least one lesson;
   at least one student system capable of receiving the at least one lesson and presenting the lesson to at least one student;
   network means for connecting the educator provider system with the at least one student system in bidirectional communication; and a video controlling means operably connected to the network means, such that when the at least one lesson is transmitted over the network means from the educator provider system to the at least one student system, the presentation of the at least one lesson is controlled by the video controlling means based on the received video file, so that the at least one student cannot advance in the at least one lesson until the video file has completed playing.

18. A system for online education that guarantees that at least one student spends a specified amount of time on at least one lesson, the system comprising:

an educator provider system for transmission of at least one lesson comprising content and at least one audio file or at least one video file associated with the content, and for transmission of a lesson completion record that certifies that the required amount of time was spent on the lesson, wherein the at least one audio file or at least one video file controls the presentation of the lesson, so that the at least one student cannot advance in the at least one lesson until the audio file or video file has completed playing;

at least one student system capable of receiving the at least one lesson and presenting the at least one lesson to at least one student; and network means connected to the educator provider system and the at least one student system in bidirectional communication;

such that after completion of the transmission of the at least one lesson over the network means from the education provider system to the at least one student system, the lesson completion record is immediately transmitted to the at least one student system upon the completion of the lesson.

19. The system of claim 18, wherein the lesson completion record includes a unique course instance identifier.

20. The system of claim 18, wherein:

the lesson completion record comprises an electronic certificate; and the at least one student system includes means for printing the electronic certificate.

21. The system of claim 18, further comprising:

an education authority system connected to the network means for receipt of the lesson completion record.

22. The method of claim 21, wherein the completion record comprises a certificate of completion, and wherein the student system on which the lesson was completed further comprises means for printing, the method further comprising the step of:

printing the certificate of completion with the printing means.

23. The method of claim 22, wherein the online education system further comprises an education authority system connected to the network, the method further comprising the step of:

transmitting the completion record from the educator provider system to the education authority system.

24. A method of online education of at least one lesson that guarantees that at least one student spends a specified amount of time on the at least one lesson, the method comprising the steps of:

providing an online education system including:
(a) an educator provider system for transmission of at least one interactive lesson comprising an audio file, wherein the at least one interactive lesson comprises content and the audio file is associated with the content of the at least one lesson;
(b) at least one student system capable of receiving the at least one lesson and presenting the at least one lesson to at least one student; and
(c) network means for connecting the educator provider system with the at least one student system in bidirectional communication;

transmitting one of the at least one lessons from the educator provider system to one of the at least one student systems;

receiving and presenting the transmitted lesson at the student system; and controlling the pace of the presentation of the received lesson with the received audio file, so that the at least one student cannot advance in the received lesson until the received audio file has completed playing.

25. A method of online education of at least one lesson that guarantees that at least one student spends a specified amount of time on the at least one lesson, the method comprising the steps of:

providing an online education system including:
(a) an educator provider system for transmission of a plurality of presentations that make up a lesson, at least one of the plurality of presentations comprising content and having at least one audio file associated therewith, the at least one audio file being associated with the content;
(b) at least one student system capable of receiving each of the plurality of presentations and presenting each of the plurality of presentations to at least one student; and
(c) network means for connecting the educator provider system with the at least one student system in bidirectional communication;

transmitting each of the plurality of presentations from the educator provider system to one of the at least one student systems;

receiving and presenting each of the transmitted plurality of presentations at the student system; and controlling the pace of the presentation of each of the transmitted plurality of presentations of the lesson based on the audio file associated with that presentation, so that the at least one student cannot advance in the lesson until the at least one audio file associated with that presentation has completely played.

26. A method of online education of at least one lesson that guarantees that at least one student spends a specified amount of time on the at least one lesson, the method comprising the steps of:

providing an online education system including:
(a) an educator provider system for transmission of at least one interactive lesson comprising content and at least one video file, the at least one video file being associated with the content of the at least one interactive lesson;
(b) at least one student system capable of receiving the at least one lesson and presenting the lesson to at least one student;
(c) network means for connecting the educator provider system with the at least one student system in bidirectional communication; and
(d) a video controlling means operably connected to the network means;

transmitting one of the at least one lessons from the educator provider system to one of the at least one student systems;

receiving and presenting the transmitted lesson at the student system; and controlling the pace of the presentation of the received lesson with the video controlling means based on the at least one video file, so that the at least one student cannot advance in the received lesson until the at least one video file has completed playing.

27. A method of online education of at least one lesson that guarantees that at least one student spends a specified amount of time on at least one lesson wherein the at least one lesson comprises content, the method comprising the steps of:

providing an online education system including:
(a) an educator provider system for transmission of at least one lesson and for transmission of a lesson completion record that certifies that the required amount of time was spent on the lesson;
(b) at least one student system capable of receiving the at least one lesson and presenting the at least one lesson to at least one student; and
(c) network means connected to the educator provider system and the at least one student system in bidirectional communication;

transmitting one of the at least one lessons from the educator provider system to one of the at least one student systems;

receiving and presenting the transmitted lesson at the student system until the transmitted lesson is completed;

controlling the presentation of the lesson with at least one audio file or at least one video file associated with the content of the at least one lesson so that the at least one student cannot advance in the lesson until the at least one audio file or at least one video file has completed playing;

generating the lesson completion record with the educator provider system; and immediately transmitting the lesson completion record from the educator provider system to the student system on which the lesson was completed, upon the completion of the lesson.

28. A method of online education of at least one lesson that guarantees that at least one student spends a specified amount of time on the at least one lesson, wherein the at least one lesson comprises content, the method comprising the steps of:

providing an online education system including:
(a) an educator provider system for transmission of at least one lesson and for transmission of a lesson completion record that certifies that the required amount of time was spent on the lesson;
(b) a student system capable of receiving the at least one lesson and presenting the at least one lesson to a student using the student system;
(c) an education authority system capable of receipt of the lesson completion record; and
(d) a network means operably connected to the educator provider system, the student system, and the education authority system;

transmitting one of the at least one lessons from the educator provider system to the student system;

receiving and presenting the transmitted lesson at the student system until the transmitted lesson is completed;

controlling the presentation of the lesson with at least one audio file or at least one video file associated with the content of the at least one lesson so that the at least one student cannot advance in the lesson until the at least one audio file or at least one video file has completed playing;

generating with the educator provider system the lesson completion record; and immediately transmitting the lesson completion record from the educator provider system to the education authority system upon the completion of the lesson.

29. The method of claim 28, further comprising, after the step of transmitting the lesson completion record, the step of:

accepting the lesson completion record.

30. The method of claim 29, further comprising, after the step of accepting the lesson completion record, the step of:

granting course credit to the student.

31. An online education system that guarantees that at least one student spends a specified amount of time on at least one lesson, the lesson comprising a plurality of presentations, each of the plurality of presentations comprising content, the system comprising:

an educator provider system for transmission of at least one lesson comprising an audio file or video file wherein the audio file or video file is associated with the content of at least one of the plurality of presentations;

at least one student system capable of receiving the at least one lesson and presenting the at least one lesson to at least one student;

network means for connecting the educator provider system with the at least one student system in bidirectional communication;

such that when the at least one lesson is transmitted over the network means from the educator provider system to the at least one student system, the presentation of the at least one lesson is controlled by a controlling means based on the received audio file or video file, so that the at least one student cannot advance the presentation having the content to which the audio file is associated until the audio file or video file has completed playing.

32. An online education system that guarantees that at least one student spends a specified amount of time on at least one lesson, the system comprising:

an educator provider system for transmission of at least one lesson comprising an audio file or video file, wherein the at least one lesson comprises content and at least one interactive test, the at least one interactive test relating to the content, and wherein the audio file or video file is associated with the content of the at least one lesson;

at least one student system capable of receiving the at least one lesson and presenting the at least one lesson to at least one student;

network means for connecting the educator provider system with the at least one student system in bidirectional communication;

such that when the at least one lesson is transmitted over the network means from the educator provider system to the at least one student system, the presentation of the at least one lesson is controlled by a controlling means based on the received audio file or video file, so that the at least one student cannot advance in the at least one lesson until the received audio file or video file has completed playing, and such that the test is transmitted to the at least one student system to determine if the at least one student has comprehended the content, and the at least one student is not permitted to advance in the at least one lesson until it is determined by the test that the at least one student has comprehended the content.

33. A method of online education of at least one lesson that guarantees that at least one student spends a specified amount of time on the at least one lesson, the method comprising the steps of:

providing an online education system including:
(a) an educator provider system for transmission of at least one interactive lesson, the at least one interactive lesson comprising a first presentation and a second presentation, the first presentation having content and an audio file or video file associated with the content of the first presentation, the second presentation comprising an interactive test;
(b) at least one student system capable of receiving the at least one lesson and presenting the at least one lesson to at least one student; and
(c) network means for connecting the educator provider system with the at least one student system in bidirectional communication;

transmitting the first presentation of the at least one interactive lesson from the education provider system to one of the at least one student systems;

receiving and presenting the transmitted first presentation at the same at least one student system;

controlling the pace of the presentation of the received first presentation with the received audio file or video file so that the at least one student cannot advance in the received lesson until the audio file or video file has completed playing;

transmitting the second presentation of the at least one interactive lesson from the education provider system to the same at least one student system;

receiving and presenting the transmitted second presentation at the student system;

transmitting and receiving the at least one student's answers to inquiries made to the interactive test between the education provider system to the student system, and evaluating the answers to determine whether the at least one student has comprehended the content of the lesson; and controlling the pace of the presentation of the received second presentation so that the at least one student cannot advance in the received lesson until it is determined that that student has comprehended the content of the lesson.

* * * * *